(12) United States Patent
Gou et al.

(10) Patent No.: US 8,718,059 B2
(45) Date of Patent: May 6, 2014

(54) PROCESSING METHOD, SYSTEM AND USER EQUIPMENT OF MULTIMEDIA BROADCAST MULTICAST SERVICE (MBMS) SERVICE

(75) Inventors: Wei Gou, Shenzhen (CN); Dongmei Li, Shenzhen (CN); Wendong Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 89 days.

(21) Appl. No.: 13/509,350

(22) PCT Filed: Jun. 16, 2011

(86) PCT No.: PCT/CN2011/075805
§ 371 (c)(1),
(2), (4) Date: May 11, 2012

(87) PCT Pub. No.: WO2011/160560
PCT Pub. Date: Dec. 29, 2011

(65) Prior Publication Data
US 2012/0224577 A1    Sep. 6, 2012

(30) Foreign Application Priority Data
Jun. 24, 2010   (CN) .......................... 2010 1 0220740

(51) Int. Cl.
*H04L 12/56*    (2006.01)
(52) U.S. Cl.
USPC ........................................................ 370/390
(58) Field of Classification Search
USPC .............. 370/390, 395.3, 420, 432, 450, 453, 370/456
See application file for complete search history.

(56) References Cited

U.S. PATENT DOCUMENTS

| 2006/0291410 A1* | 12/2006 | Herrmann ...................... 370/328 |
| 2009/0213775 A1* | 8/2009 | Rey et al. ...................... 370/312 |
| 2009/0245155 A1* | 10/2009 | Fukunaga et al. ............. 370/312 |
| 2009/0305712 A1* | 12/2009 | Franceschini et al. ........ 455/450 |

FOREIGN PATENT DOCUMENTS

| CN | 1798063 A | 7/2006 |
| CN | 101420655 A | 4/2009 |
| CN | 101521850 A | 9/2009 |

OTHER PUBLICATIONS

International Search Report for PCT/CN2011/075805, English translation attached to original, Both Completed by the Chinese Patent Office on Sep. 9, 2011, All together 8 Pages.

* cited by examiner

*Primary Examiner* — Mark Rinehart
*Assistant Examiner* — Ellen A Kirillova
(74) *Attorney, Agent, or Firm* — Brooks Kushman P.C.

(57) ABSTRACT

A method and system are provided for processing a multimedia broadcast and multicast service and a user equipment. The method includes: a user equipment (UE) receiving a multimedia broadcast and multicast service (MBMS) service issued by the network side (101), and the UE actively or passively reporting receiving state information about the MBMS service to the network side (102). The method and system can enable the network side to learn the receiving condition of the MBMS service by the user equipment and can manage the user equipment according to the receiving state information about the MBMS service reported by the UE.

13 Claims, 2 Drawing Sheets

PROCESSING METHOD, SYSTEM AND USER EQUIPMENT OF MULTIMEDIA BROADCAST MULTICAST SERVICE (MBMS) SERVICE

CROSS-REFERENCE TO RELATED APPLICATION

This application is the U.S. national phase of PCT Appln. No. PCT/CN2011/075805 filed Jun. 16, 2011 which claims priority to Chinese Application No. 201010220740.8 filed Jun. 24, 2010, the disclosures of which are incorporated in their entirety by reference herein.

TECHNICAL FIELD

The present invention relates to the communication field, and particularly, to a method and system for processing a multimedia broadcast and multicast service, and user equipment.

BACKGROUND OF THE RELATED ART

With the rapid development of Internet and the popularization of large-screen multi-functional mobile phones, there appear a large number of mobile data multimedia services and various wide bandwidth multimedia services, such as video conference, TV broadcast, video on demand, video advertisement, online education, interactive game etc., which not only meet the increasing service demand of the mobile user but also bring new service increasing points to the mobile operators. These mobile data multimedia service requires a plurality of users to be able to simultaneously receive the same data, and as compared to common data service, it has features such as large data amount, long duration, and delay sensitivity. In order to effectively employ the mobile network resources, the 3rd Generation Partnership Project (3GPP) proposes a Multimedia Broadcast Multicast Service (MBMS). The MBMS service is a technology of transferring data from a data source to a plurality of targets, achieving the share of network (including core network and access network) resources, and improving the utilization rate of the network resources (especially air interface resources). The MBMS service defined by 3GPP not only can achieve plain text message multicast and broadcast with low rate but also can achieve the broadcast and multicast of high speed multimedia services and provide various rich video, audio and multimedia services, which undoubtedly conforms to the development trend of the future mobile data and provides a better service prospect for the development of 3rd Generation (3G) mobile communication.

With the promotion and application of the MBMS service, how to enable the network side to learn the receiving condition of the MBMS service and thus effectively manage the MBMS service is a problem to be solved.

CONTENT OF THE INVENTION

The object of the present invention is provide a method and system for processing a multimedia broadcast and multicast service, and a user equipment, so as to solve the problem of how to enable the user equipment to learn the receiving condition of the MBMS service.

In order to solve the above technical problem, the present invention provides a method for processing a multimedia broadcast and multicast service, and the method comprises:

a user equipment (UE) receiving a multimedia broadcast and multicast service (MBMS) service issued by a network side, and the UE actively or passively reporting MBMS receiving state information to the network side.

In the above method, the step of the UE reporting the MBMS receiving state information to the network side comprises:

the UE reporting to the network side first information indicating that the UE is receiving the MBMS service during the UE continuously receives the MBMS service;

and/or the UE reporting to the network side second information indicating that the UE stops receiving the MBMS service after having stopped receiving the MBMS issued by the network side.

In the above method, the UE reports the first information and/or second information about one or more MBMS services using a same message.

In the above method, in the step of the UE reporting to the network side first information indicating that the UE is receiving the MBMS service during the UE continuously receives the MBMS service, all the UEs receiving the MBMS service send the first information about the MBMS service dispersedly within a certain time window, wherein the certain time window is configured and issued or preset by the network side.

In the above method, each UE reports the receiving state information at a specific moment within the time window, ways for determining the specific moment of each UE comprises: marking all available moments within the time window, carrying out modulo operation on each UE identity (UE_ID) with the number of all the available moments in the time window, taking the report moment corresponding to the obtained modulo value as the specific moment of each UE.

In the above method, a starting moment of the time window is a moment when the MBMS service is issued or a moment when the network side sends a statistic message, or a certain moment after the MBMS service has been issued for a period of time, or a certain moment after the network side has sent the statistic message.

In the above method, a condition for the UE to report the first information about the MBMS service is: the duration for the UE to receive that MBMS service is greater than a certain value, with the certain value being configured and issued or preset by the network side.

The method further comprises: the network side controlling the issuing of all the MBMS services according to the receiving state information reported by the UE, wherein the controlling comprises: the network side determining whether to stop issuing the MBMS service according to situation of the first information about the MBMS service reported by the UE, or, enlarging sending area of the MBMS service with receiving rate being greater than a preset value, or reducing sending area of the MBMS service with receiving rate being less than a preset value.

Before the step of the UE passively reporting the MBMS receiving state information, the method further comprising: the network side sending a statistic message to the UE, in the step of the UE passively reporting the MBMS receiving state information, the UE only reporting the first information about the MBMS service for one time according to the MBMS service required for statistics in a statistic message sent by the network side.

In the above method, the receiving state information about the MBMS service comprises one or more of the following information: information indicating an identity of the UE, information indicating the MBMS service, information explicitly or implicitly indicating a multicast broadcast single frequency network (MBSFN) area to which the MBMS service belongs, and information indicating the receiving being taking place or the receiving being stopped.

Before the step of the UE passively reporting the MBMS receiving state information, the method further comprising: the network side issuing a statistic message to the UE within a certain range, the step of the UE reporting the MBMS receiving state information comprising: the UE having received the statistic message reporting the MBMS receiving state information to the network side.

The method further comprises: after the reported receiving state information meets the requirements, the network side issuing to the UE a message of stopping reporting the receiving state information, after having receiving the message, the UE stopping reporting the MBMS receiving state information.

In order to solve the above problem, the present invention also provides a user equipment, comprising a service receiving module and a receiving state information reporting module, wherein the service receiving module is configured to receive a multimedia broadcast and multicast service (MBMS) service; and the receiving state information reporting module is connected to the service receiving module and is configured to report the MBMS receiving state information of the service receiving module.

In the above user equipment, the service receiving module is further configured to, when starting to receive or stopping receiving the MBMS service, send a start-to-receive notification and stop-receiving notification respectively to the receiving state information reporting module; and the receiving state information reporting module is configured to report the MBMS receiving state information of the service receiving module according to the following manner: receive the start-to-receive notification and the stop-receiving notification, and report the MBMS receiving state information to the network side according to the start-to-receive notification and stop-receiving notification.

In the above user equipment, the receiving state information reporting module is configured to report the MBMS receiving state information to the network side according to the start-to-receive notification and stop-receiving notification according to the following manner: report to the network side first information indicating that the MBMS service is being received when receiving the two notifications regarding the MBMS service; and after having received the stop-receiving notification of the MBMS service, report second information indicating that the receiving of the MBMS service being issued by the network side is stopped.

In the above user equipment, the receiving state information reporting module of all the UEs receiving the MBMS service sends the first information about the MBMS service dispersedly within in a certain time window, with the certain time window being configured and issued or preset by the network side.

In the above user equipment, a condition for the receiving state information reporting module of the UE to report the first information is: before receiving the stop-receiving notification sent by the service receiving module, time since the receiving starting notification is received exceeds a certain value, with the certain value being configured and issued or preset by the network side.

In the above user equipment, the MBMS receiving state comprises one or more of the following information: information indicating UE identity, information indicating the MBMS service, information explicitly or implicitly indicating a multicast broadcast single frequency network (MBSFN) area to which the MBMS service belongs, and information indicating the receiving being taking place or the receiving being stopped.

In order to solve the above problem, the present invention also provides a method for processing a multimedia broadcast and multicast service, comprising:

a network side sending feedback configuration information about a multimedia broadcast and multicast service (MBMS) service; and a user equipment (UE) receiving the MBMS service receiving the feedback configuration information, and actively or passively reporting receiving state information about the MBMS service to the network side.

In the above method, the feedback configuration information comprises information indicating a time window regarding one or more MBMS services, and/or, receiving duration to be met for reporting the receiving state information regarding one or more MBMS services.

In the above method, when the feedback configuration information comprises information indicating the time window, all the UEs receiving the one or more MBMS services send the first information about the MBMS service dispersedly within the time window; and when the feedback configuration information comprises the receiving duration, the UE reports the receiving state information regarding the one or more MBMS services after the receiving duration is met.

In the above method, the feedback configuration information is configured by the network side or preset according to a standard protocol.

In the above method, the MBMS receiving state information comprises one or more of the following information: information indicating UE identity, information indicating the MBMS service, information explicitly or implicitly indicating the MBSFN area to which the MBMS belongs, and information indicating the receiving being taking place or the receiving being stopped.

In order to solve the above problem, the present invention also provides a system for processing a multimedia broadcast and multicast service, comprising a configuration information issuing device and a user equipment (UE), wherein the configuration information issuing device is located at the network side and configured to send feedback configuration information about the multimedia broadcast and multicast service (MBMS) service; and the UE is configured to receive the feedback configuration information, and actively or passively report receiving state information about the MBMS service according to the feedback configuration information.

In the above system, the feedback configuration information comprises information indicating the time window regarding one or more MBMS services, and/or, the receiving duration to be met for reporting the receiving state information regarding one or more MBMS services.

In the above system, when the feedback configuration information comprises information indicating the time window, all the UEs receiving the one or more MBMS services send the first information about the MBMS service dispersedly within the time window; and when the feedback configuration information comprises the receiving duration, the UE reports the receiving state information regarding the one or more MBMS services after the receiving duration is met.

In the above system, the feedback configuration information is configured by the network side or preset according to a standard protocol.

In the above system, the MBMS receiving state information comprises one or more of the following information: information indicating UE identity, information indicating the MBMS service, information explicitly or implicitly indicating the MBSFN area to which the MBMS belongs, and information indicating the receiving being taking place or the receiving being stopped.

In the present invention, the user equipment (UE) actively or passively reports the receiving state information about the multimedia broadcast and multicast service (MBMS) traffic, enabling the network side to learn the receiving condition of the MBMS traffic by the user equipment and managing the user equipment according to the receiving state information about the MBMS traffic reported by the UE.

PREFERRED EMBODIMENTS OF THE PRESENT INVENTION

In order to make the object, technical solution and advantages of the present invention more clear, the embodiments of the present invention will be further described in detail in conjunction with the accompanying drawings. It needs to note that the embodiments of the present application and the features in the embodiments can be combined with each other at random if there is no conflict.

In the embodiments of the present invention, the user equipment (UE) actively or passively reports the receiving state information about the multimedia broadcast and multicast service (MBMS) service, enabling the network side to manage the MBMS service according to the receiving state information about the MBMS service reported by the UE, for example, controlling the ON or OFF of the service and carrying out statistic analysis of the service receiving condition, etc.

Figure 1:
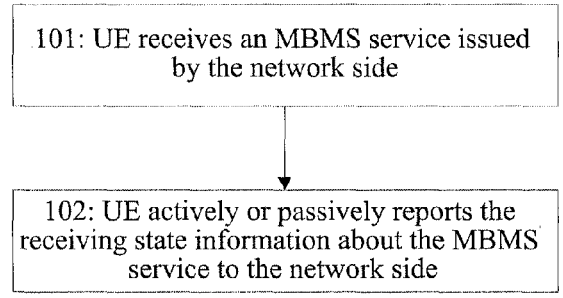
FIG. 1 is a schematic diagram of a method for processing a multimedia broadcast and multicast service according to an embodiment of the present invention.

As shown in FIG. 1, the method for processing a multimedia broadcast and multicast service according to an embodiment of the present invention comprises:

Step 101: a UE receives a multimedia broadcast and multicast service (MBMS) service issued by the network side, and Step 102: the UE actively or passively reports receiving state information about the MBMS service to the network side.

In this embodiment, it is referred to as passive reporting that the network side sends a statistic message to require the relevant UE to report the receiving condition of the MBMS service. It is referred to as active reporting that the UE actively sends the receiving condition of the MBMS service after starting to receive the MBMS service.

The step of the UE reporting the receiving state information about the MBMS service to the network side comprises:

the UE reporting to the network side first information (hereinafter also referred to as information A) indicating that it is receiving that MBMS service when it continuously receives the MBMS service; and the UE reporting to the network side second information (hereinafter also referred to as information B) indicating that it stops receiving that MBMS service after having stopped receiving the MBMS issued by the network side.

Of course, according to the particular situation on receiving or stopping receiving the MBMS service, the UE can report the first information and/or second information about one or more MBMS services using the same message.

For example, the same message is used to report that MBMS service 1 is being received and the receiving of MBMS service B is stopped, or the same message is used to report that MBMS services 1 and 2 are being received; or the same message is used to report that the receiving of MBMS services 1 and 2 is stopped.

The receiving state information about the MBMS service comprises one or more of the following information: information indicating the UE identity, information indicating the MBMS service, information indicating the multicast broadcast single frequency network (MBSFN) area to which the MBMS service belongs, and information indicating receiving the MBMS service is taking place or stopped.

The information indicating UE identity can be user equipment identity ((UE-Identity), or S-Temporary Mobile Subscriber Identity (S-TMSI), or a random 40-bit value, which is mainly used for indicting the UE identity which is receiving the MBMS service.

The information indicating the MBMS service can be the ID of the MBMS service.

The information indicating the MBMS service is mainly used for indicating the identity of the MBMS service being received or interested in receiving. In particular, it can be represented using the ID of the MBMS service directly and can also be notified indirectly, for example, the combination of one or more of the session identity (sessionId) of the MBMS service, the physical multicast channel (PMCH) information where the MBMS service is located, and the logical channel identity (MTCH) of the multicast service channel (LCID) where the MBMS service is located. For example, the information about this MBMS service is described using the information about the PMCH where the MBMS service is located+the LCID of MTCH.

The information indicating the MBSFN area to which the MBMS service belongs is mainly used for indicating the MBSFN area where the MBMS service is located, which is mainly used for helping the network side to distinguish the MBMS service being received by the UE or interested in receiving by the UE or the receipt of which is stopped belongs to which MBSFN area in the situation that the coverage of the MBSFN area is overlapped. Since in the situation that the coverage of the MBSFN area is overlapped, a cell can simultaneously belong to a plurality of MBSFN areas, once the same MBMS service is sent in two different MBSFN areas within in a certain cell, only under the assistance of the information about the MBMS service may cause description to be unclear. In particular, the information about the MBSFN area can be directly notified, for example, using the MBSFN area ID. It can also be notified indirectly, for example, using the identifier of MCCH, since in the long term evolution (LTE), there is an one-to-one correlation between an MCCH and an MBSFN, or it is identified with the update indication information about MCCH, since in the LTE, there is an one-to-one correlation between an MCCH update indication information and the MCCH, and the MCCH also corresponds to the MBSFN area one to one.

The information indicating that the MBMS service is being received or receiving the MBMS service is stopped can be represented with a preset identifier, i.e. the network side knows the purpose for the UE to send this identifier is to report that a certain MBMS service is being received, or to report that receiving a certain MBMS service is stopped.

The present invention provides the following embodiments for the UE to report information A during the receiving of the MBMS service.

Embodiment I: Report When Starting to Receive the MBMS Service

Once starting to receive a certain MBMS service, the UE sends the receiving state information about the MBMS service (information A directed towards this MBMS service) to the network side to notify the network side that it is receiving this MBMS service.

Embodiment II: Report Within a Time Window (T1) Dispersedly

In order to prevent a large number of UEs from simultaneously reporting the receiving state of the MBMS service in a centralized way when starting to receive the same MBMS service or prevent the congestion pressure and temporary resource shortage brought by the UE simultaneously reporting the receiving state of the MBMS service, all the UEs receiving the MBMS service send the first information within the time window (T1) dispersedly, and each UE reports the first information at a specific moment within the time window.

For example, the starting time of a certain MBMS service is set as moment 0, the definition of T1 period of time is 100 s, so that according to the embodiments of the present invention, all the UEs receiving this MBMS service can send the receiving state information (information A) about the MBMS service to the network side within 100 s after having received the MBMS service. This method is especially suitable for the scenario that a certain MBMS service just starts to be sent, since once a popular MBMS service is started to be sent, a large number of UEs will start to receive it simultaneously. As to the situation that a certain MBMS service is already being sent and a UE receives it in the middle way, the above restriction of T1 period of time may not be adopted (or may be adopted), since the MBMS service is already being sent, the UE per se which is started to be received in the middle way can be viewed as being occurring randomly, and the reporting congestion pressure brought about is not that heavy.

The time window (T1) information (which is mainly the length and starting moment of the time window) may be a fixed value preset according a standard protocol to which the network side and UE conform or is issued by the network side; and Ti can be set according to different service types, with different values for different service types. As to a certain MBMS service, if the UE keeps receiving this MBMS service within the time T1, then the UE only reports information A about this MBMS service for one time.

The specific moment can be determined by the UE according to its identity information. The UE learns its own reporting moment according to its own UE_ID information. Specifically, all the available moments within the time window T1 is marked, then modulo value is made for the number of all the available moments within the time window T1 with the UE identity (UE_ID) of each UE, and the available reporting moment corresponding to the obtained modulo value is taken as the specific moment of each UE.

Figure 2:
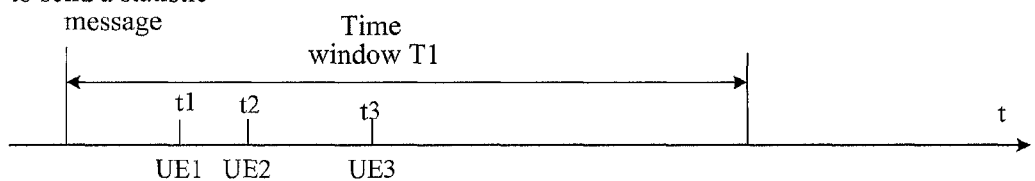
FIG. 2 is a schematic diagram of reporting receiving state information after a time window T1 is introduced according to an embodiment of the present invention.

As shown in FIG. 2, UE1, UE2 and UE3 report the receiving state information about a certain MBMS service within the T1 period of time and report information A at moments t1, t2, and t3 respectively.

As to different scenarios, the definition of the starting moment of the time window T1 is different, and the definition under the corresponding scenario is applied under different scenarios. When the method of the network side sending a statistic message (the statistic message is information sent by the network side for requiring relevant UEs to report the receiving condition of some MBMS services), the starting point of the time window T1 is the moment for the network side to send the statistic message, or the moment of sending the statistic message delayed with 4 ms (4 ms is the time for the UE to process the received statistic message and generate acknowledge information) is taken as the starting moment of the time window T1. It can be understood that when the UE passively reports the receiving condition of the MBMS service, as to the MBMS service to be counted in the statistic message sent by the network side, if the UE needs to report the receiving condition of a certain MBMS service, then the UE only reports it within the T1 time window for one time. When the method of the network side sending the statistic message is not used and the method of the UE actively reporting the receiving state of the MBMS service is used, the starting moment of the time window T1 is the moment for the UE to start to receive this MBMS service, or the moment after the moment T2 for the UE to receive this MBMS service (the description of T2 can refer to the following embodiment III) is taken as the starting moment of the time window T1.

Embodiment III: Report When the Receiving Duration is Longer Than T2

In order to avoid frequently reporting the first information to the network side by the UE due to UE frequently switching the received MBMS services, it can be formulated that the condition for the UE to report the first information about the MBMS service is that the duration for the UE to receive the MBMS service is longer than the specific value (T2). That is, it is formulated that the UE cannot report the receiving state information of MBMS service until the duration when the UE receives the MBMS service exceeds T2, and the size of the duration T2 can be configured by the network side and then sent to the UE, and it can also be an agreed value according to a standard protocol. The specific value T2 is configured and issued by the network side or it is preset, and the setting of T2 can be set according to different MBMS service types.

Embodiment IV: Report Dispersedly When the Receiving Duration is Longer Than T2

Figure 3:
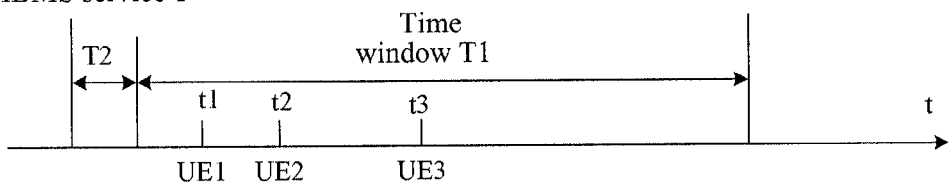
FIG. 3 is a schematic diagram of reporting receiving state information after a time window T1 and duration T2 are introduced according to an embodiment of the present invention.

The combination of embodiments II and III can effectively avoid the UE reporting in a centralized way or reporting frequently, as shown in FIG. 3, under the premise that UE1, UE2 and UE3 receiving a certain MBMS service meet the condition that the receiving duration is longer than the specific value T2, their own specific moment t1, t2 and t3 within the time of the time window T1 are determined respectively and information A is reported.

Optionally, the UE can actively report the receiving state information and can also start to report or stop reporting the receiving state information according to the trigger of the network side.

It is triggered to start reporting: the network side issues a statistic message to the UE within a certain range, and the UE receiving the statistic message reports the receiving state information about the MBMS service to the network side.

It is triggered to stop reporting: when the network side has received enough receiving state information about the MBMS service reported by the UE and the requirements of the network side are met, the network side issues to the UE a message of stopping reporting the receiving state information, after having received the message, the UE stops reporting the receiving state information about the MBMS service.

If the UE receives the message of stopping reporting the receiving state information about the MBMS service, the UE which does not have time to report can stop sending the receiving state information about the MBMS service. For example, a certain UE will report the receiving state information about the MBMS service with respect to MBMS service 1, but the network side already received lots of receiving state information about the MBMS service reported by other UEs with respect to MBMS service 1, the network side no longer needs other UEs to report the receiving state information about the MBMS service, at this moment, the network side can send a message of stopping reporting the receiving state information about the MBMS service, after having received this message of stopping reporting the receiving state information about the MBMS service, this UE can stop reporting the receiving state information about the MBMS service.

Optionally, as to the situation that the UE actively reports, the UE periodically reports or only reports for one time the first information about the MBMS service within the continuous receiving duration of the MBMS service.

Periodical reporting refers to the network side formulates that the UE has to report the receiving state information about their own MBMS service to the network side for one time within each period T3. That is, after the UE has received the MBMS service, it sends for one time the receiving state information about the MBMS service to the network side within each period T3 formulated by the network side and reports for one time within in each period.

As to the situation that the UE actively reports, only reporting for one time refers to: as to an MBMS service being received, the UE only sends the receiving state information (information A) about the MBMS service for one time within the continuous receiving duration from starting reporting to stopping reporting, and the receiving state information (information B) about the MBMS is sent to the network side until the UE stops receiving this MBMS service.

If the UE starts to receive this MBMS service once again, then the UE further has to report the receiving state information (information A) about the MBMS service.

When the UE stops receiving an MBMS service as sending of the MBMS service is completed, the UE no longer sends the receiving state information about the MBMS service to the network side (which refers to sending information B about this MBMS service), that is because after the sending of this MBMS service is completed, the network side knows that the UE will surely stop receiving this MBMS service.

The network side can control the issue of the MBMS service according to the receiving state information reported by the UE, which in particular includes: when a certain MBMS service is started to issue, in the method of the UE passively or actively reporting the first information about the MBMS service, the network side stops issuing this MBMS service when the network side does not receive the first information about the MBMS service.

Alternatively, after having carried out statistic on all the received receiving state information, the network side can further enlarge the sending area of the MBMS service with the receiving rate thereof being greater than the preset value, and shrink the sending area of the MBMS service with the receiving rate thereof being less than the preset value.

The receiving state information about the MBMS service sent by the UE in particular is: just for indicating to the network side that the UE is receiving this MBMS service, and there are lots of methods to achieve this purpose and which are not limited in the present invention, as long as it can achieve that "the network side is indicated that the UE is receiving this MBMS service". For example, an identifier indicating this MBMS service being sent and information indicating the receiving state information about the MBMS service being "being received". If the UE is already receiving a certain MBMS service and starts to receive the second MBMS service, then when the UE sends the receiving state information about the MBMS service, it only includes the information about the second MBMS service being received by the UE, or also include the information about all the MBMS services being received by the UE.

The UE can send it to the network side via a specific signaling.

The above processing methods with different functions and objects can be used in combination without conflicts. For example, the mechanism of time window T1 and the mechanism of duration T2 can be used in combination, as shown in FIG. 3.

According to the method of the present invention, if the UE starts to receive or is receiving the MBMS service, then the UE shall notify the network side of the receiving state information about its own MBMS service, for example, notifying the network side that it starts to receive or is receiving a certain MBMS service; and if the UE stops receiving the MBMS service, then the UE shall notify the network side of the receiving state information about its own MBMS service, for example, notifying the network side that it already stops receiving a certain MBMS service. As such, the network side knows which UEs are receiving a certain MBMS service at any moment. It is convenient for the network side to adjust the sending of some MBMS service according to the receiving state information about the MBMS service reported by the UE.

Application Example

When a popular MBMS service is started to send, there may have a large number of UEs starting to receive it simultaneously, as a result, a large number of UEs may send the receiving state information (information A) about the MBMS service to the network side simultaneously, it will bring rather heavy pressure to the resources at the network side, assuming that the network side does not have so many resources to be allocated to these UEs for reporting information A, the mechanism of time window T1 is introduced so as to prolong the reporting time of these UEs and avoid temporary resource shortage.

The network side configures and issues the time window T1 as 10 s and requires the UE to report the receiving state information within the time window T1 (10 s).

The network side starts to send MBMS service 1 to a certain cell, and the UE of this cell starts to receive the MBMS service 1, in order to correspond to different UEs selecting different moments to report the receiving state information about the MBMS service in the defined time window T1, information A and/or information B are included.

Hereinafter, there is a method for a UE to select its own reporting moment within the time window T1 particularly, i.e. how to learn its own reporting moment according to its own UE_ID for each UE which has to report the receiving state information about the MBMS service. Since the time window T1 is formulated as 10s, then there are 10000 ms all together and correspond to 10000 uplink subframes in the LTE, assuming that there are 2500 available reporting moments, they can be marked as 0-2499 (2499 is obtained by 2500-1) according to the time order, then the UE is formulated to employ its own UE_ID mod 2500 to obtain a modulo value, then the reporting moment corresponding to the modulo value is the reporting moment of this UE.

In the case that the UE starts to receive the MBMS service 1 and stops receiving this MBMS service 1 within the time window T1, and the UE does not send the receiving state information about MBMS service before stopping receiving the receiving state information about the MBMS but reports that it is receiving the MBMS service 1, the UE no longer needs to send the receiving state information about the MBMS service to the network side to report the receiving state information about the MBMS service 1, i.e. not sending information A and B.

In order to implement the above method, an embodiment of the present invention also provides a UE, and the UE comprises a service receiving module and a receiving state information reporting module, wherein:

the service receiving module is configured to receive the MBMS service, the receiving state information reporting module is connected to the service receiving module and is configured to report the receiving state information about the service receiving module receiving the MBMS service.

the service receiving module is further configured to, when starting to receive or stopping receiving the MBMS service, send a start-to-receive notification and stop-receiving notification respectively to the receiving state information reporting module; and the receiving state information reporting module is further configured to receive the start-to-receive notification and stop-receiving notification, and report the receiving state information about the MBMS service to the network side according to the start-to-receive notification and stop-receiving notification;

the receiving state information reporting module reports to the network side the first information indicating that the MBMS service is being received when receiving the two notifications regarding the MBMS service; and after having received the stop-receiving notification of the MBMS service, report the second information indicating that the receiving of the MBMS service being issued by the network side is stopped.

The receiving state information reporting module of all the UEs which receive the MBMS services sends the first information about the MBMS service dispersedly within in a certain time window, with the certain time window being configured and issued or preset by the network side.

The condition for the receiving state information reporting module of the UE to report the first information is: before receiving the stop-receiving notification sent by the service receiving module, the time since the start-to-receive notification is received exceeds a certain value, with the certain value being configured and issued or preset by the network side.

It needs to illustrate that the time window or moment described in the present invention is not absolute time but relative time determined with subframes, and it can understood that in the present invention, the moment for the network side to issue a certain MBMS service is consistent with the moment for the UE to receive this MBMS service, and the moment for the network side to send the statistic message is consistent with the moment for the UE to receive the statistic message.

Figure 4:
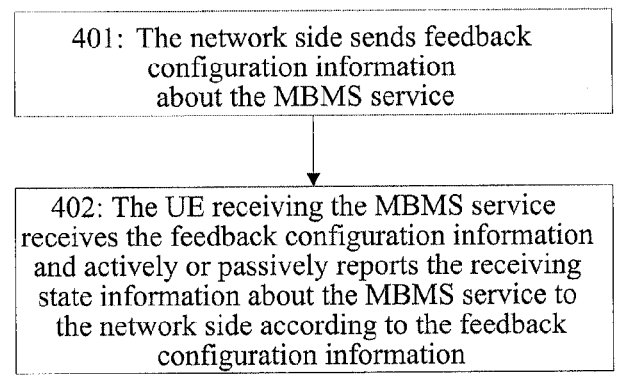
FIG. 4 is another schematic diagram of a method for processing a multimedia broadcast and multicast service according to an embodiment of the present invention.

The present invention also provides another method for processing a multimedia broadcast and multicast service, as shown in FIG. 4, the method comprises:

step 401: the network side sends feedback configuration information about the MBMS service;

step 402: a user equipment (UE) receiving the MBMS service receives the feedback configuration information, and actively or passively report receiving state information about the MBMS service to the network side.

The feedback configuration information comprises information indicating the time window regarding one or more MBMS services, and/or, the receiving duration to be met when reporting the receiving state information regarding one or more MBMS services;

when the feedback configuration information comprises information indicating the time window, all the UEs receiving the one or more MBMS services send the first information about the MBMS service dispersedly within the time window.

When the feedback configuration information comprises the receiving duration, the UE reports the receiving state information regarding the one or more MBMS services after the receiving duration is met.

The feedback configuration information is configured by the network side or preset according to a standard protocol.

The receiving state information about the MBMS service comprises one or more of the following information: information indicating the UE identity, information indicating the MBMS service, information explicitly or implicitly indicating the MBSFN area to which the MBMS belongs, and information indicating the receiving being taking place or the receiving being stopped.

The present invention also provides a system for processing a multimedia broadcast and multicast service, comprising a configuration information issuing device and a user equipment (UE), wherein, the configuration information issuing device is located at the network side and configured to send feedback configuration information about the MBMS service; and the UE is configured to receive the feedback configuration information, and actively or passively report receiving state information about the MBMS service according to the feedback configuration information.

The feedback configuration information comprises information indicating the time window regarding one or more MBMS services, and/or, the receiving duration to be met when reporting the receiving state information regarding one or more MBMS services;

when the feedback configuration information comprises information indicating the time window, all the UEs receiving the one or more MBMS services send the first information about the MBMS service dispersedly within the time window.

When the feedback configuration information comprises the receiving duration, the UE reports the receiving state information regarding the one or more MBMS services after the receiving duration is met.

The feedback configuration information is configured by the network side or preset according to a standard protocol.

The receiving state information about the MBMS service comprises one or more of the following information: information indicating the UE identity, information indicating the MBMS service, information explicitly or implicitly indicating the MBSFN area to which the MBMS belongs, and information indicating the receiving being taking place or the receiving being stopped.

Those skilled in the art shall understand that all or part of the steps in the above methods can be completed by instructing relevant hardware by programs, and the programs can be stored in a computer readable storage medium, such as read only memory, magnetic disk, or optical disk, etc. Optionally, all or part of the steps of the above embodiments can also be implemented using one or more integrated circuits. Accordingly, the respective module/unit in the above embodiments can be implemented in the format of hardware, or in the format of software function module. The present invention is not limited to any particular form of combination of hardware and software.

Industrial Applicability

In the present invention, the UE actively or passively reports the receiving state information about the MBMS service, enabling the network side to learn the situation on receiving the MBMS service by the user equipment and managing the MBMS service according to the receiving state information about the MBMS service reported by the UE.

What is claimed is:

1. A method for processing a multimedia broadcast and multicast service, comprising:
    a plurality of user equipments (UEs) receiving a multimedia broadcast and multicast service (MBMS) service issued by a network side, and
    each UE actively or passively reporting MBMS receiving state information to the network side with the following manner: the UE reporting to the network side first information indicating that each of the UEs is receiving or interested in receiving the MBMS service; and/or the UE reporting to the network side second information indicating that the UE stops receiving the MBMS service after having stopped receiving the MBMS issued by the network side;
    the network side controlling the issuing of all the MBMS services according to the receiving state information reported by the UEs with the following manner: determining whether to start or stop issuing the MBMS service according to situation of the first information about the MBMS service reported by the UEs, or, enlarging sending area of the MBMS service with receiving rate of being greater than a preset value, or reducing sending area of the MBMS service with receiving rate being less than a preset value;
    wherein, when coverage of multicast broadcast single frequency network (MBSFN) areas being overlapped is configured, the receiving state information comprises information indicating the MBMS service and information indicating the MBSFN area to which the MBMS service belongs.

2. The method as claimed in claim 1, wherein the UE reports the first information and/or second information about one or more MBMS services using a same message.

3. The method as claimed in claim 1, wherein in the step of the UE reporting to the network side first information indicating that the UE is receiving the MBMS service during the UE continuously receives the MBMS service, all the UEs receiving the MBMS service send the first information about the MBMS service dispersedly within a certain time window, wherein the certain time window is configured and issued or preset by the network side.

4. The method as claimed in claim 3, wherein each UE reports the receiving state information at a specific moment within the time window, ways for determining the specific moment of each UE comprises: marking all available moments within the time window, carrying out modulo operation on each UE identity (UE_ID) with the number of all the available moments in the time window, taking the report moment corresponding to the obtained modulo value as the specific moment of each UE.

5. The method as claimed in claim 3, wherein a starting moment of the time window is a moment when the MBMS service is issued or a moment when the network side sends a statistic message, or a certain moment after the MBMS service has been issued for a period of time, or a certain moment after the network side has sent the statistic message.

6. The method as claimed in claim 1, wherein a condition for the UE to report the first information about the MBMS service is: the duration for the UE to receive that MBMS service is greater than a certain value, with the certain value being configured and issued or preset by the network side.

7. The method as claimed in claim 1, before the step of the UE passively reporting the MBMS receiving state information, the method further comprising: the network side sending a statistic message to the UE,
    in the step of the UE passively reporting the MBMS receiving state information, the UE only reporting the first information about the MBMS service for one time according to the MBMS service required for statistics in a statistic message sent by the network side.

8. The method as claimed in claim 1, before the step of the UE passively reporting the MBMS receiving state information, the method further comprising: the network side issuing a statistic message to the UE within a certain range,
    the step of the UE reporting the MBMS receiving state information comprising: the UE having received the statistic message reporting the MBMS receiving state information to the network side.

9. The method as claimed in claim 1, further comprising: after the reported receiving state information meets the requirements, the network side issuing to the UE a message of stopping reporting the receiving state information, after having receiving the message, the UE stopping reporting the MBMS receiving state information.

10. A user equipment, comprising a service receiving module and a receiving state information reporting module, wherein
    the service receiving module is configured to receive a multimedia broadcast and multicast service (MBMS) service; and
    the receiving state information reporting module is connected to the service receiving module and is configured to report the MBMS receiving state information of the service receiving module;
    the service receiving module is further configured to, when starting to receive or stopping receiving the MBMS service, send a start-to-receive notification and stop-receiving notification respectively to the receiving state information reporting module; and the receiving state information reporting module is configured to report the MBMS receiving state information of the service receiving module according to the following manner: receive the start-to-receive notification and the stop-receiving notification, and report the MBMS receiving state information to the network side according to the start-to-receive notification and stop-receiving notification;
    the receiving state information reporting module is further configured to report the MBMS receiving state information to the network side according to the start-to-receive notification and stop-receiving notification according to the following manner; report to the network side first information indicating that the MBMS service is being received when receiving the two notifications regarding the MBMS service; and after having received the stop-receiving notification of the MBMS service, report second information indicating that the receiving of the MBMS service being issued by the network side is stopped;
    wherein, the network side is configured to control the issuing of all the MBMS services according to the receiving state information reported by the UE with the following manner: determine whether to start or stop issuing the MBMS service according to situation of the first information about the MBMS service reported by the UE, or, enlarge sending area of the MBMS service with receiving rate being greater than a preset value, or reduce sending area of the MBMS service with receiving rate being less than a preset value.

11. The user equipment as claimed in claim 10, wherein the receiving state information reporting module of all the UEs receiving the MBMS service sends the first information about the MBMS service dispersedly within in a certain time window, with the certain time window being configured and issued or preset by the network side.

12. The user equipment as claimed in claim 10, wherein a condition for the receiving state information reporting module of the UE to report the first information is: before receiving the stop-receiving notification sent by the service receiving module, time since the receiving starting notification is received exceeds a certain value, with the certain value being configured and issued or preset by the network side.

13. The user equipment as claimed in claim 10, wherein the MBMS receiving state comprises one or more of the following information: information indicating UE identity, information indicating the MBMS service, information explicitly or implicitly indicating a multicast broadcast single frequency network (MBSFN) area to which the MBMS service belongs, and information indicating the receiving being taking place or the receiving being stopped.

* * * * *